United States Patent
Nayshtut et al.

(10) Patent No.: US 10,402,571 B2
(45) Date of Patent: Sep. 3, 2019

(54) COMMUNITY-BASED DE-DUPLICATION FOR ENCRYPTED DATA

(71) Applicant: Intel Corporation, Santa Clara, CA (US)

(72) Inventors: Alex Nayshtut, Gan Yavne (IL); Omer Ben-Shalom, Rishon Le-Tzion (IL); Terry H. Yoshii, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/810,033

(22) Filed: Jul. 27, 2015

(65) Prior Publication Data

US 2016/0057142 A1   Feb. 25, 2016

Related U.S. Application Data

(63) Continuation of application No. 13/799,318, filed on Mar. 13, 2013, now Pat. No. 9,116,849.

(51) Int. Cl.
*G06F 21/60* (2013.01)
*G06F 11/14* (2006.01)
(Continued)

(52) U.S. Cl.
CPC .......... *G06F 21/60* (2013.01); *G06F 11/1453* (2013.01); *G06F 21/6227* (2013.01);
(Continued)

(58) Field of Classification Search
CPC ....... H04L 9/083; G06F 21/60; G06F 11/1453
See application file for complete search history.

(56) References Cited

U.S. PATENT DOCUMENTS

| 5,990,810 A | 11/1999 | Williams |
| 8,117,464 B1 | 2/2012 | Kogelnik |

(Continued)

FOREIGN PATENT DOCUMENTS

| CN | 101441583 A | 5/2009 |
| CN | 102308288 A | 1/2012 |

(Continued)

OTHER PUBLICATIONS

International Search Report and Written Opinion for Application No. PCT/US2014/018669, dated May 29, 2014, 11 pages.

(Continued)

*Primary Examiner* — Robert B Leung
(74) *Attorney, Agent, or Firm* — Barnes & Thornburg LLP

(57) ABSTRACT

Technologies for de-duplicating encrypted content include fragmenting a file into blocks on a computing device, encrypting each block, and storing each encrypted block on a content data server with associated keyed hashes and member identifications. The computing device additionally transmits each encrypted block with an associated member encryption key and member identification to a key server. As part of the de-duplication process, the content data server stores only one copy of the encrypted data for a particular associated keyed hash, and the key server similarly associates a single member encryption key with the keyed hash. To retrieve the file, the computing device receives the encrypted blocks with their associated keyed hashes and member identifications from the content data server and receives the corresponding member decryption key from the key server. The computing device decrypts each block using the member decryption keys and combines to blocks to generate the file.

21 Claims, 8 Drawing Sheets

(51) Int. Cl.
    *H04L 9/08*      (2006.01)
    *G06F 21/62*     (2013.01)
    *H04L 29/06*     (2006.01)
    *H04L 9/14*      (2006.01)
    *H04L 9/32*      (2006.01)

(52) U.S. Cl.
    CPC ............ *H04L 9/083* (2013.01); *H04L 9/0894* (2013.01); *H04L 9/14* (2013.01); *H04L 9/3242* (2013.01); *H04L 63/0435* (2013.01); *H04L 63/061* (2013.01); *H04L 63/062* (2013.01); *H04L 63/0876* (2013.01); *H04L 2209/60* (2013.01)

(56) References Cited

U.S. PATENT DOCUMENTS

| | | | |
|---|---|---|---|
| 8,401,185 | B1 | 3/2013 | Telang |
| 8,495,392 | B1* | 7/2013 | Bardale .................. G06F 21/62 711/117 |
| 8,572,409 | B2 | 10/2013 | Spackman |
| 8,682,868 | B2* | 3/2014 | Ghuge ................ G06F 17/3015 707/692 |
| 9,086,819 | B2* | 7/2015 | Panchbudhe ......... G06F 3/0608 |
| 9,390,101 | B1* | 7/2016 | Schneider ......... G06F 17/30156 |
| 2005/0044092 | A1 | 2/2005 | Adya et al. |
| 2008/0152149 | A1 | 6/2008 | Bauchot et al. |
| 2008/0243855 | A1* | 10/2008 | Prahlad .............. G06F 21/6218 |
| 2009/0313483 | A1 | 12/2009 | Ranade |
| 2010/0083003 | A1 | 4/2010 | Spackman |
| 2010/0312800 | A1* | 12/2010 | Lumb .................. G06F 3/0608 707/796 |
| 2010/0332454 | A1* | 12/2010 | Prahlad .............. G06F 17/3002 707/654 |
| 2012/0017096 | A1 | 1/2012 | Snider |
| 2012/0159175 | A1 | 6/2012 | Yocom-Piatt et al. |
| 2012/0204024 | A1 | 8/2012 | Augenstein et al. |
| 2013/0024687 | A1 | 1/2013 | Lumb |
| 2014/0025948 | A1* | 1/2014 | Bestler .................. H04L 9/0863 713/167 |
| 2014/0189348 | A1 | 7/2014 | Ei-Shimi et al. |

FOREIGN PATENT DOCUMENTS

| | | |
|---|---|---|
| CN | 102546149 | 7/2012 |
| JP | 2004180141 A | 6/2004 |
| JP | 2009535704 A | 10/2009 |
| JP | 2010-072900 | 2/2010 |
| JP | 2011-170707 | 1/2011 |
| WO | 2012158654 A1 | 11/2012 |

OTHER PUBLICATIONS

"Cloud Storage," Wikipedia, The Free Encyclopedia, retrieved from: <http://en.wikipedia.org/w/indexphp?title=Cloud_storage&oldid=498630020>, edited Jun. 23, 2012, 4 pages.

"Data deduplication," Wikipedia, The Free Encyclopedia, retrieved from: <http://en.wikipedia.org/w/index/php?title=Data_dedeuplication&oldid=499698897>, edited Jun. 28, 2012, 5 pages.

European Search Report for Application No. 16161010.0-1870, dated Jun. 30, 2016, 10 pages.

Office Action and English Translation for Japanese Patent Application No. 2016-500410, dated Aug. 23, 2016, 13 pages.

European Search Report for Patent Application No. 16161010.0-1870, dated Jun. 30, 2016, 10 pages.

Office Action and English Translation for Japanese Patent Application No. 2016-075734, dated Jun. 13, 2017, 13 pages.

Office Action, Search Report, and English Translation for Chinese Patent Application No. 201480008657.0, dated Jun. 2, 2017, 40 pages.

European Office action in European patent application No. 16161010.0, dated Nov. 6, 2018 (6 pages).

Second Office Action dated Jan. 31, 2018 for Chinese Patent Application No. 201480008657.0, 3 pages.

Examination Report dated Feb. 13, 2018 for European Patent Application No. 16 161 010.0-1218, 8 pages.

First Office Action dated Jan. 11 2018 for Chinese Patent Application No. 201610066552.1, 3 pages.

Second Office Action in Chinese Patent Application No. 201610066552.1 dated Aug. 13, 2018, including English translation (15 pages).

* cited by examiner

COMMUNITY-BASED DE-DUPLICATION FOR ENCRYPTED DATA

CROSS-REFERENCE TO RELATED APPLICATION

The present application is a continuation application of U.S. application Ser. No. 13/799,318, entitled "COMMUNITY-BASED DE-DUPLICATION FOR ENCRYPTED DATA," which was filed on Mar. 13, 2013.

BACKGROUND

In today's society, massive amounts of data are transferred between computing devices and stored every day. As such, there are efforts to reduce the amount of unnecessary overhead in various facets of computing. For example, data de-duplication is a process that significantly reduces storage consumption when large volumes of data are stored at a location (e.g., as a backup system). Data de-duplication allows developers to replace large redundant blocks of data with relatively small reference points to a single copy of a data block.

In many implementations, stored data may be encrypted or otherwise stored in a secured manner. Encryption and hash algorithms allow secure transmission and storage of digital data. Encryption algorithms ideally generate data that appears pseudo-random, and the same data encrypted under different cryptographic keys should yield vastly different encrypted data. As such, typical data de-duplication does not work with data encrypted under different cryptographic keys.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
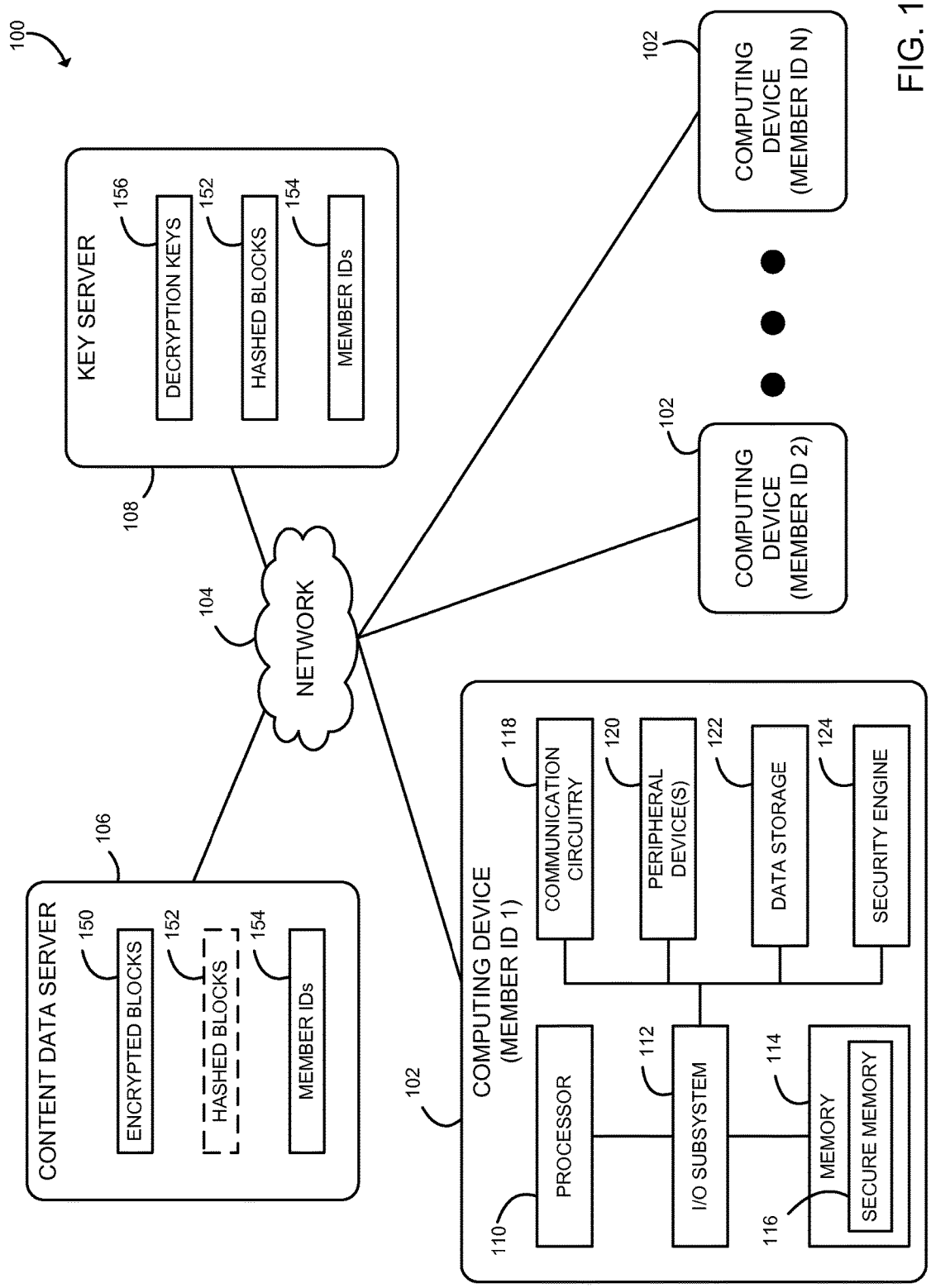
FIG. 1 is a simplified block diagram of at least one embodiment of a system for de-duplication of encrypted data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for de-duplication of encrypted data includes one or more computing devices 102, a network 104, a content data server 106, and a key server 108. In use, as discussed in more detail below, the computing devices 102 may store and/or retrieve encrypted data from the content data server 106. Further, the content data server 106 and the key server 108 work in tandem to de-duplicate the stored encrypted data. Although only one network 104, one content data server 106, and one key server 108 are illustratively shown in FIG. 1, the system 100 may include any number of networks 104, content data servers 106, and key server 108. Further, as shown, the system 100 may include one, two, or more computing devices 102. In some embodiments, the computing devices 102 are embodied as member devices (or simply "members") in a community (e.g., a company, business unit, family, or other collective entity). Community membership may be established in a variety of ways depending on the implementation. For example, in some embodiments, the content data server 106 and/or the key server 108 determine which computing devices 102 may be members of the community. In another embodiment, a whitelist and/or blacklist may be established in determining membership (e.g., by the content data server 106 and/or the key server 108). As discussed below, the member computing devices 102 in the community share a community cryptographic key used in the de-duplication system 100.

Each of the computing devices 102 may be embodied as any type of computing device capable of establishing a communication link with content data server 106 and the key server 108 and performing the functions described herein. For example, the computing device 102 may be embodied as a cellular phone, smartphone, tablet computer, laptop computer, personal digital assistant, mobile Internet device, desktop computer, server, and/or any other computing/communication device. In some embodiments, the computing devices 102 may be embodied as encryption appliances (e.g., appliances used by an organization to backup to a cloud provider rather than a particular device). As shown in FIG. 1, the illustrative computing device 102 includes a processor 110, an input/output ("I/O") subsystem 112, a memory 114, a communication circuitry 118, one or more peripheral devices 120, a data storage 122, and a security engine 124. Of course, the computing device 102 may include other or additional components, such as those commonly found in a typical computing device (e.g., various input/output devices), in other embodiments. Additionally, in some embodiments, one or more of the illustrative components may be incorporated in, or otherwise from a portion of, another component. For example, the memory 114, or portions thereof, may be incorporated in the processor 110 in some embodiments. In another embodiment, the security engine 124 is incorporated in the communication circuitry 118.

The processor 110 may be embodied as any type of processor capable of performing the functions described herein. For example, the processor may be embodied as a single or multi-core processor(s), digital signal processor, microcontroller, or other processor or processing/controlling circuit. Similarly, the memory 114 may be embodied as any type of volatile or non-volatile memory or data storage capable of performing the functions described herein. In operation, the memory 114 may store various data and software used during operation of the computing device 102 such as operating systems, applications, programs, libraries, and drivers. In some embodiments, the memory 114 includes a secure memory 116. The secure memory 116 may be, for example, a secure partition of the memory 114 or may be independent of the memory 114. Further, the secure memory 116 may store private or otherwise secure cryptographic keys. The memory 114 is communicatively coupled to the processor 110 via the I/O subsystem 112, which may be embodied as circuitry and/or components to facilitate input/output operations with the processor 110, the memory 114, and other components of the computing device 102. For example, the I/O subsystem 112 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 112 may form a portion of a system-on-a-chip (SoC) and be incorporated, along with the processor 110, the memory 114, and other components of the computing device 102, on a single integrated circuit chip.

The communication circuitry 118 of the computing device 102 may be embodied as any communication circuit, device, or collection thereof, capable of enabling communications between the computing device 102 and other remote devices (e.g., the content data server 106 and the key server 108) over the network 104. The communication circuitry 118 may be configured to use any one or more communication technology (e.g., wireless or wired communications) and associated protocols to effect such communication. In some embodiments, the communication circuitry 118 is embodied as a network interface card (NIC). Further, in some embodiments, one or more of the functions described herein may be offloaded to the communication circuitry 118 or NIC.

The peripheral devices 120 of the computing device 102 may include any number of additional peripheral or interface devices. The particular devices included in the peripheral devices 120 may depend on, for example, the type and/or intended use of the computing device 102. The data storage 122 may be embodied as any type of device or devices configured for short-term or long-term storage of data such as, for example, memory devices and circuits, memory cards, hard disk drives, solid-state drives, or other data storage devices.

The security engine 124 is configured to perform various security and cryptographic functions of the computing device 102 as discussed in more detail below. The security engine 124 may be embodied as a security co-processor or similar device separate from the processor 110. In such embodiments, the security engine 124 may operate in an out-of-band manner relative to the processor 110 (e.g., the security engine 124 may operate, including communicate with remote devices, independent of the power state of the processor 110). In other embodiments, the security engine 124 may be embodied as, or otherwise include, a cryptographic accelerator incorporated into the processor 110 or a stand-alone cryptographic software/firmware. Further, the security engine 124 and/or the communication circuitry 118 may be configured to execute a standard authentication and access control protocol with remote devices.

The network 104 may be embodied as any number of various wired and/or wireless telecommunication networks. As such, the network 104 may include one or more networks, routers, switches, computers, and/or other intervening devices. For example, the network 104 may be embodied as or otherwise include one or more cellular networks, telephone networks, local or wide area networks, publicly available global networks (e.g., the Internet), or any combination thereof.

The content data server 106 and the key server 108 may be each embodied as any type of computing device or server capable of performing the functions described herein. For example, in some embodiments, the content data server 106 and/or key server 108 may be similar to the computing device 102 as described above. That is, the content data server 106 and key server 108 may be embodied as an enterprise-level server computer, a desktop computer, a laptop computer, a tablet computer, a cellular phone, smartphone, personal digital assistant, mobile Internet device, and/or any other computing/communication device. Further, the content data server 106 and/or key server 108 may include components similar to those of the computing device 102 discussed above. The description of those components of the computing device 102 is equally applicable to the description of components of the content data server 106 and the key server 108 and is not repeated herein for clarity of the description. Further, it should be appreciated that the content data server 106 and/or key server 108 may include other components, sub-components, and devices commonly found in a computing device or server, which are not discussed above in reference to the computing device 102 and not discussed herein for clarity of the description.

As shown in FIG. 1, the illustrative content data server 106 includes encrypted blocks 150, hashed blocks 152, and member identifications (IDs) 154. Additionally, the key server 108 includes decryption keys 156, the hashed blocks 152, and the member identifications 154. As discussed in detail below, the computing devices 102 may encrypt and generate hashes of blocks of a file to be stored in the system 100 and transmit both the encrypted block 150 and hashed blocks 152 to the content data server 106. Further, in some embodiments, each member computing device 102 in the community has a unique member identification, which is transmitted to both the content data server 106 and the key server 108. As discussed in greater detail below, each of the computing devices 102 also has file encryption and decryption keys, which may be used to encrypt the data blocks. In some embodiments, the file decryption keys are transmitted to the key server 108 as well.

As discussed in greater detail below, the system 100 allows a balance between the security afforded by encryption and the benefits offered by data de-duplication. The system 100 establishes a trust relationship between community members and permits de-duplicating content with the community with minimal risk of unauthorized or undesirable data exposure.

Figure 2:
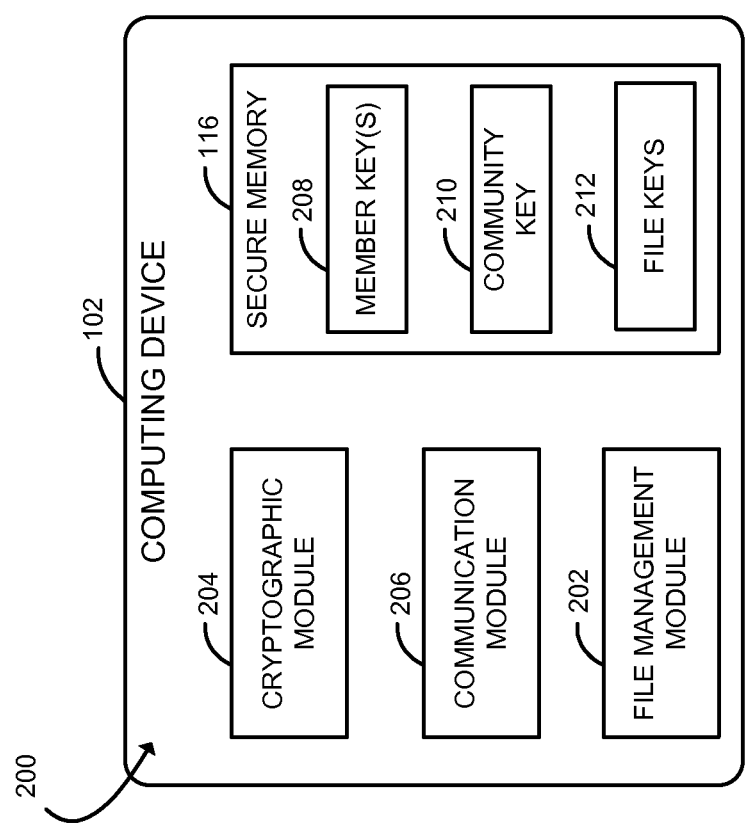
FIG. 2 is a simplified block diagram of at least one embodiment of an environment of a computing device of the system of FIG. 1.

Referring now to FIG. 2, in use, each computing device 102 of the system 100 establishes an environment 200 for storing content on the content data server 106 and retrieving content from the content data server 106. The environment 200 in the illustrative embodiment includes a file management module 202, a cryptographic module 204, a communication module 206, and the secure memory 116. Each of the file management module 202, the cryptographic module 204, and the communication module 206 may be embodied as hardware, software, firmware, or a combination thereof The file management module 202 performs file deconstruction, reconstruction, compression, decompression, and other file management functions. For example, the file management module 202 fragments or otherwise breaks a given file (e.g., a digital file) that is to be stored on the content data server 106 into one or more blocks or chunks. The file may be embodied as, for example, a digital file, program or application, atomic section of code or data, or other suitable data structure. In some embodiments, the file management module 202 is configured to fragment a file into fixed-length blocks, whereas in other embodiments, the file management module 202 may fragment a file into blocks of varying length. In the case of fixed-length blocks, the block size may be dictated by standards established by the computing devices 102 and/or the content data server 106. Additionally, the file management module 202 is configured to subsequently combine (i.e., the inverse of fragmentation) the fragmented blocks into the file. To facilitate proper combination or reconstruction of the blocks, when the file is fragmented, the file management module 202 may generate a list of the blocks associated with the original file. For example, in one embodiment, the file management module 202 may fragment a file into blocks X, Y, and Z, which may over time be stored in nonadjacent sections of memory in the computing device 102 and/or on the content data server 106. As such, the list of blocks provides a mechanism for identifying the particular blocks associated with a file and their correct order for reconstruction purposes. In the illustrative embodiment, the list of blocks includes a list of keyed hashes of the blocks belonging to the file and may include other information (e.g., their order). As discussed below, the computing device 102 encrypts each of the blocks. Accordingly, in another embodiment, the list may be associated with the encrypted blocks and/or the unencrypted blocks.

The cryptographic module 204 performs security and cryptographic procedures. In some embodiments, the cryptographic module 204 may access cryptographic keys stored in the secure memory 116 (e.g., member key(s) 208, a community key 210, and file keys 212). Additionally, the cryptographic module 204 may generate cryptographic keys (i.e., the file keys 212) to encrypt and/or decrypt various file blocks. In some embodiments, the cryptographic module 204 generates a separate file key 212 (or a separate cryptographic key pair if asymmetric keys are used) "on the fly" for each file being encrypted. For example, the cryptographic module 204 encrypts each block of a fragmented file using a file encryption key 212 and encrypts the list of blocks generated by the file management module 202 using the member encryption key 208. Of course, the cryptographic module 204 may also perform decryption procedures. Each member key 208 is embodied as a cryptographic key specifically related to the particular member of the community (i.e., the specific computing device 102). The community key 210 is a cryptographic key shared by each of the computing devices 102 of the system 100 (i.e., shared by the members of the community). For example, the computing devices 102 in an enterprise environment may be members of the same community and, therefore, share the same community key 210. Of course, a single computing device 102 may be a member of multiple communities and, as such, may maintain multiple community keys 210 in some embodiments. Additionally, it should be appreciated that in various embodiments each of the member key 208 and the community key 210 may be a symmetric or asymmetric cryptographic key. Of course, if a symmetric encryption algorithm is used, the encryption and decryption cryptographic keys are the same keys. As such, the file keys, member keys 208 and/or community keys 210 may be referred to below sometimes as an "encryption" or "decryption" key with the understanding that such keys may be the same key if symmetric encryption is used.

Additionally, the cryptographic module 204 is configured to generate a keyed hash of each block using the community key 210. Any suitable hash function and keying method may be used. For example, in various embodiments, a secure hash algorithm (e.g., SHA-0, SHA-1, SHA-2, SHA-3) or message digest algorithm (e.g., MD5) may be used as a hash function. The keyed hash may be generated, for example, by performing some operation involving the data block and the community key 210 and inputting the result of that operation into the hash function. For example, in one embodiment, the keyed hash may be generated by concatenating or appending the community key 210 to the data block and using the result of that concatenation operation as the hash function input. In another embodiment, the logical exclusive-or (i.e., XOR) operation may be applied to the data block and community key prior to hashing the data. In a further embodiment, a message authentication code (MAC) algorithm may be used to generate a keyed hash of each block. Of course, any suitable method of generated a keyed hash based on the community key 210 may be used.

It should be appreciated that the member keys 208 and the community keys 210 may be distributed to the computing devices 102 through any suitable key distribution mechanism. In one embodiment, a key distribution server (e.g., the content data server 106, the key server 108, or other key server) or oracle may be used to distribute keys. In another embodiment, a conference key distribution system may be used to establish, for example, the community key 210. In some embodiments, file keys 212 may also be distributed to the computing devices 102 from a key distribution server.

The communication module 206 handles the communication between the computing device 102 and remote devices (e.g., the content data server 106 and the key server 108) through the network 104. For example, in some embodiments, the communication module 206 handles secure and/or unsecure communication between the computing device 102 and remote devices. As discussed above, in some embodiments, the communication module 206 may facilitate such communication for the security engine 124 regardless of the power state of the processor 110.

Figure 3:
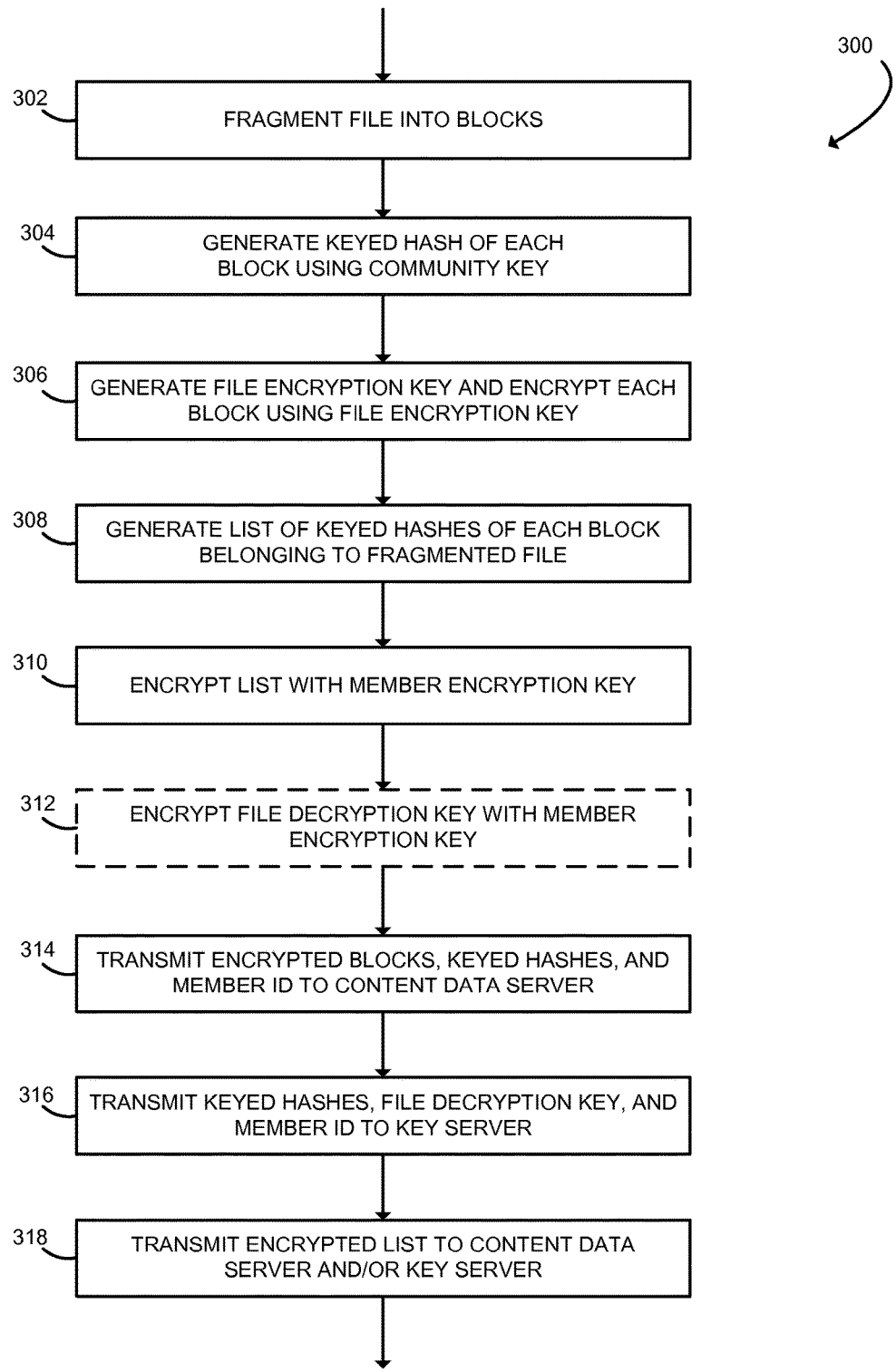
FIG. 3 is a simplified flow diagram of at least one embodiment of a method for storing content on a content data server using a computing device of the system of FIG. 1.

Referring now to FIG. 3, in use, each computing device 102 of the system 100 may execute a method 300 for storing content on the content data server 106. For example, the computing device 102 may store content on the content data server 106 for safe-keeping and later retrieval (e.g., in the event that the data is lost or corrupted on the computing device 102). The illustrative method 300 begins with block 302 in which the computing device 102 identifies a file to be stored on the content data server 106 and fragments the file into blocks. As discussed above, the computing device 102 may break the file into fixed-length blocks in which the block length/size is established by the content data server 106. In block 304, the computing device 102 generates a keyed hash of each block using the shared community key 210. As discussed above, any suitable mechanism for generating a keyed hash may be implemented insofar as the community key 210 is used as the key to the hash function.

In block 306, the computing device 102 generates a file encryption key 212 and encrypts each of the blocks using the file encryption key 212 of the computing device 102 selected for use with the file. As discussed above, in some embodiments, the computing device 102 generates a file encryption key 212 (and decryption key in the case of asymmetric cryptography) "on the fly" to encrypt each file block. Of course, in other embodiments, the file encryption key 212 may be selected from a set of previously generated file encryption keys 212 or received from a key distribution server. The computing device 102 generates a list of blocks belonging to the fragmented file in block 306. In the illustrative embodiment, the list identifies the hashed blocks (i.e., the outputs of block 304). As discussed above, in some embodiments, the list of blocks includes information indicating which blocks are associated with the fragmented file and the order in which the blocks should be combined (i.e., put back together) once decrypted. In another embodiment, the generated list identifies the unencrypted blocks or the encrypted blocks rather than the hashed blocks. Regardless, in block 310, the computing device 102 encrypts the list with its member encryption key 208. In some embodiments, the computing device 102 may also, in block 312, encrypt the file decryption key with its member encryption key 208 for added security.

In block 314, the computing device 102 transmits the encrypted blocks, the keyed hash of each block, and the member identification of the computing device 102 to the content data server 106. Additionally, in block 316, the computing device 102 transmits the keyed hash of each block, the file decryption key 212 of the computing device 102, and the member identification of the computing device 102 to the key server 108. As discussed above, in some embodiments, the file decryption key 212 transmitted to the key server 108 is further encrypted by the member encryption key 208 of the computing device 102. Of course, for improved efficiency, the computing device 102 may transmit the above information for multiple blocks at the same time. Further, some embodiments of the methods and systems as described above may only be implemented by sophisticated parties (e.g., businesses and organizations) due to, for example, the expectation that other members are available to decrypt encrypted file decryption keys. Less sophisticated parties may, in some embodiments, implement the disclosed technologies without further encrypting the file decryption key.

As discussed below, the content data server 106 and the key server 108 execute de-duplication methods to determine whether to store a particular encrypted block and file decryption key 212 or to associate the member ID of the computing device 102 with an already stored keyed hash (e.g., if the keyed hash of a particular block matches an already stored keyed hash). Depending on the particular implementation (e.g., which device stores which type of data), the computing device 102 transmits the encrypted list of blocks associated with the file to the content data server 106 and/or the key server 108 in block 318. Of course, in some embodiments, methods similar to those described herein may be used to implement client-side de-duplication prior to encryption of data.

Figure 4:
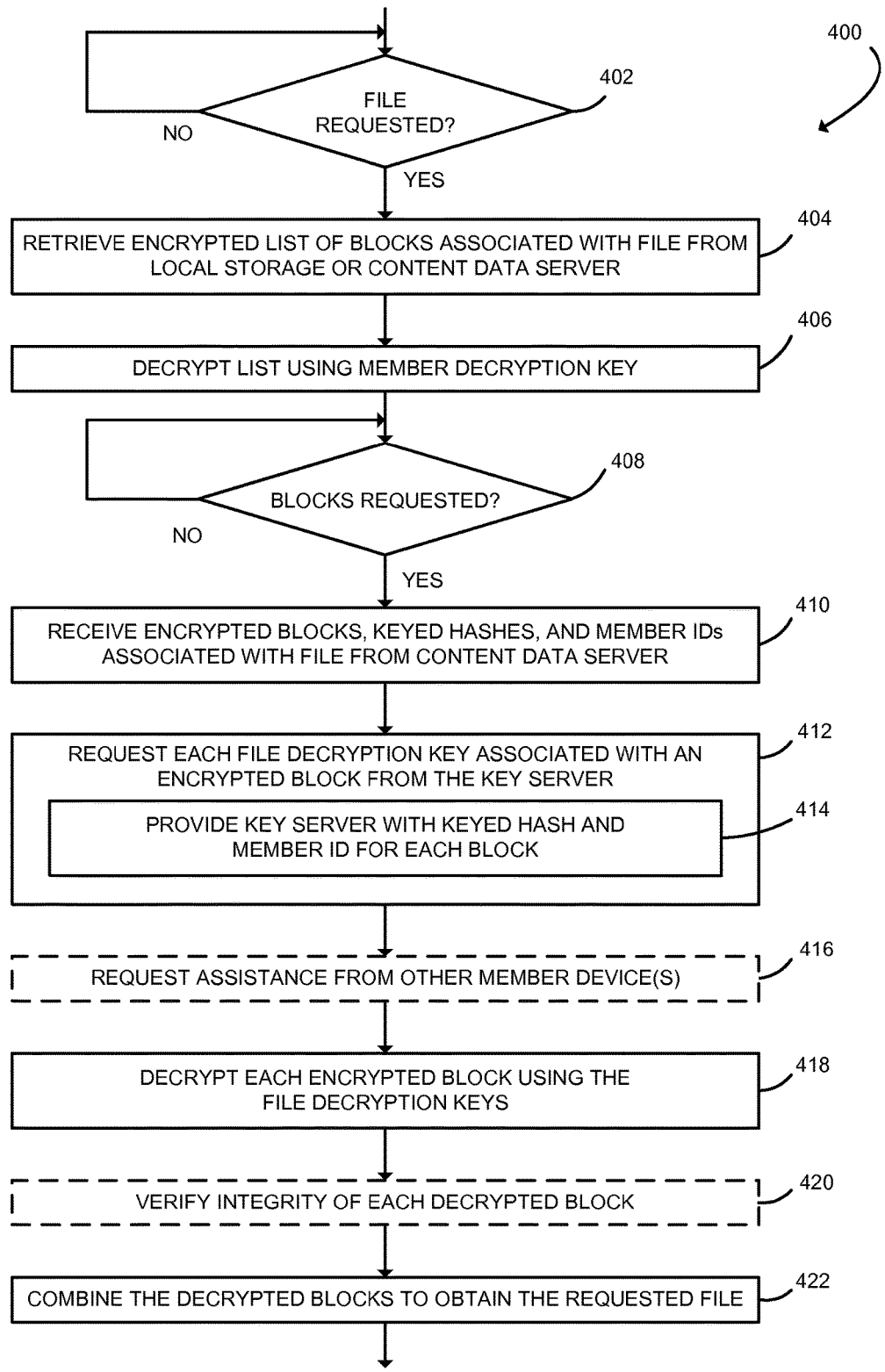
FIG. 4 is a simplified flow diagram of at least one embodiment of a method for retrieving content from a content data server using a computing device of the system of FIG. 1.

Referring now to FIG. 4, in use, each computing device 102 of the system 100 may execute a method 400 for retrieving content from a content data server 106. The method 400 begins with block 402 in which the computing device 102 determines whether a file has been requested. It should be appreciated that, in some embodiments, the computing device 102 is only able to retrieve files previously stored on the content data server 106. If the computing device 102 has requested a file from the content data server 106, the computing device 102 receives the encrypted list of blocks associated or corresponding with the requested file from the content data server 106 in block 404. Of course, the computing device 102 may retrieve the list from the memory 114 or the data storage 122 in an embodiment in which the list is stored locally and the data has not been lost (e.g., due to corruption or a natural disaster). In an embodiment in which the computing device 102 generates a list identifying only unencrypted blocks of the fragmented file in block 306 (See FIG. 3), the content data server 106 may generate a list of the encrypted blocks associated with each file as the encrypted blocks are received from one of the computing devices 102 in the first instance. In block 406, the computing device 102 decrypts the list of blocks using its member decryption key 208. As discussed above, from the list of blocks, the computing device 102 can determine which blocks are associated with a desired file.

In block 408, the computing device 102 determines whether blocks associated with the desired file have been requested. If the computing device 102 has requested the data blocks associated with the desired file, in block 410, the computing device 102 receives the corresponding encrypted blocks, keyed hashes, and member IDs (i.e., the member ID of the computing device 102 that stored each particular encrypted block to the content data server 106) from the content data server 106. As discussed below, the content data server 106 associates a specific keyed hash and member ID with a particular encrypted block. Similarly, the key server 108 associates a specific keyed hash and member ID with a particular file decryption key 212. In block 412, the computing device 102 requests the file decryption key 212 associated with each encrypted block from the key server 108. In doing so, the computing device 102, in block 414, provides the key server 108 with the keyed hash and member ID for each requested block as received from the content data server 106. As noted above, each block stored on the content data server 106 has been encrypted using a file encryption key 212 generated by one of the computing devices 102. As such, the corresponding file decryption key 212 may be used to decrypt the encrypted block. As discussed above, the file encryption key 212 and the file decryption key 212 may be the same key if symmetric encryption is used. In some embodiments, the computing device 102 transmits only the keyed hashes to the key server 108 when requesting the corresponding file decryption keys 212.

As discussed above, in some embodiments, the file decryption key 212 is further encrypted by the member encryption key 208 of the computing device 102 that first stored the encrypted block on the content data server 106 (See block 310 of FIG. 3). In such an embodiment, if any of the file decryption keys are encrypted by the member encryption key 208 of a different computing device 102 (i.e., due to de-duplication), the computing device 102 accessing the encrypted block is unable to decrypt it without the member decryption key 208 of that other computing device 102 and, therefore, unable to decrypt the file block. As such, the computing device 102 may request assistance from the corresponding member devices in decrypting the encrypted file decryption keys in block 416. In one embodiment, the computing device 102 transmits the encrypted file decryption key 212 to the corresponding member device, the member device decrypts the encrypted file decryption key 212 using the member's private member decryption key 208, and the member device transmits the decrypted file decryption key 212 to the computing device 102 for use in decrypting the encrypted file block. Of course, the computing device 102 may otherwise request the corresponding member devices to forward the decrypted version of the encrypted file decryption keys 212.

In block 418, the computing device 102 decrypts each encrypted block using the corresponding file decryption key 212 received from the key server 108. As discussed above, in embodiments in which the file decryption keys 212 are further encrypted by a member encryption key 208, the computing device 102 must decrypt the file decryption key 212 using the corresponding member decryption key 208 in order to use the file decryption key 212 for decrypting the encrypted block. If the encrypted block was first stored on the content data server 106 with the computing device 102, the file decryption key 212 would have been encrypted under the computing device's 102 member encryption key 208. In those circumstances, the computing device 102 may simply use its own member decryption key 208 to decrypt the file decryption key 212. However, in some embodiments, the file decryption key 212 may have been encrypted with a member encryption key 208 of a member device other than the computing device 102. As such, the computing device 102 may request the decrypted version of the file decryption key 212 from that member device (e.g., by sending the encrypted file decryption key 212 for decryption by the member device).

Additionally, in some embodiments, the computing device 102 may verify, in block 420, the integrity of the decrypted block. To do so, the computing device 102 generates a keyed hash (i.e., a reference keyed hash) of each decrypted block using the community key 210. The computing device 102 then compares the generated key hash and the keyed hash received from the content data server 106 in block 410. If the keyed hashes match, the decrypted data block is authentic and has not been altered. In block 422, the computing device 102 combines the decrypted blocks to obtain the reconstructed and desired file.

Figure 5:
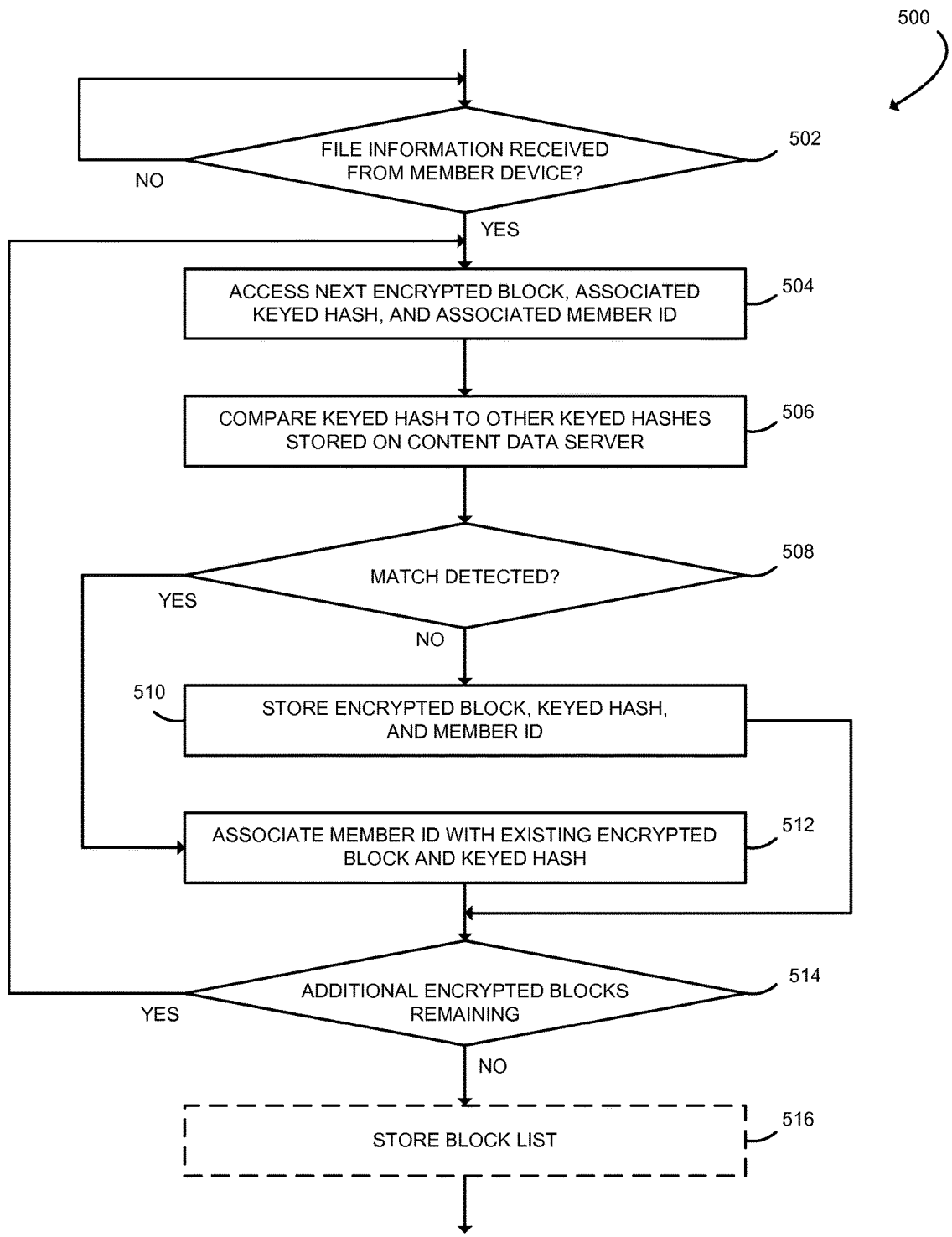
FIG. 5 is a simplified flow diagram of at least one embodiment of a method for de-duplicating encrypted content on a content data server of the system of FIG. 1.

Referring now to FIG. 5, in use, the content data server 106 may execute a method 500 for de-duplicating encrypted content. The method 500 begins with block 502 in which the content data server 106 determines whether a member device 102 has transmitted file information for storage on the content data server 106. In some embodiments, the content data server 106 determines whether the computing device 102 has supplied the appropriate information required to store encrypted blocks on the content data server 106 (i.e., the encrypted blocks, associated keyed hashes, associated member IDs, and possibly the encrypted list). As discussed above, the member device 102 fragments the file into blocks and encrypts each block of the file. If the file information has been received, in block 504, the content data server 106 accesses the next encrypted block and the associated keyed hash and member ID of the file.

In block 506, the content data server 106 compares the received keyed hash to other stored keyed hashes (i.e., stored on the content data server 106). If a match is not found in block 508, the content data server 106 stores the received encrypted block, keyed hash, and member ID on the content data server 106 in block 510. In some embodiments, the content data server 106 also associates the keyed hash, member ID, and encrypted block with each other. However, if a match is found in block 508, the content data server 106 associates the member ID of the computing device 102 with the existing encrypted block and keyed hash (i.e., the matching keyed hash) in block 512. That is, in some embodiments, the content data server 106 tracks which members (e.g., using the member IDs of those members) have stored or attempted to store an encrypted block associated with a particular keyed hash (e.g., using a list or another tracking mechanism).

In other words, the received encrypted block, keyed hash, and member ID are only stored if there is no matching keyed hash already stored on the content data server 106. If a matching keyed hash is already stored on the content data server 106, a de-duplication mechanism is employed. Because the keyed hashes match, there is overwhelming probability that the unencrypted blocks are identical. As such, rather than storing duplicate information, the content data server 106 associates or maps the member ID of the computing device 102 to the already stored encrypted block and keyed hash. In such instances, the stored encrypted block is encrypted using the member encryption key 208 of a different computing device 102 (i.e., the file encryption key 212 generated by the computing device that first stored the particular encrypted block on the content data server 106). The member ID of the member that first stored the encrypted block is needed to identify which member device corresponds with the appropriate member decryption key 208 to decrypt the file decryption key 212 as discussed herein. It should be appreciated that the content data server 106 may use any suitable data structure (e.g., table) to organize or associate keyed hashes, encrypted blocks, and member IDs with one another.

In block 514, the content data server 106 determines whether additional encrypted blocks remain. That is, the content data server 106 determines whether the keyed hash associated with each encrypted block identified in the file information has either been stored from the member device 102 that transmitted the file or was previously stored on the content data server 106 from a file storage of another member device 102. If additional encrypted block(s) remain, the method 500 returns to block 504 in which the content data server 106 retrieves the next encrypted block, keyed hash, and member ID of the file. However, if the content data server 106 determines in block 514 that all of the encrypted blocks identified in the file information have been stored on the content data server 106, the content data server 106 stores the list of blocks in block 516. It should be appreciated that the method described herein equally applies to an embodiment in which the content data server 106 receives only a portion of blocks associated with a file for storage.

Figure 6:
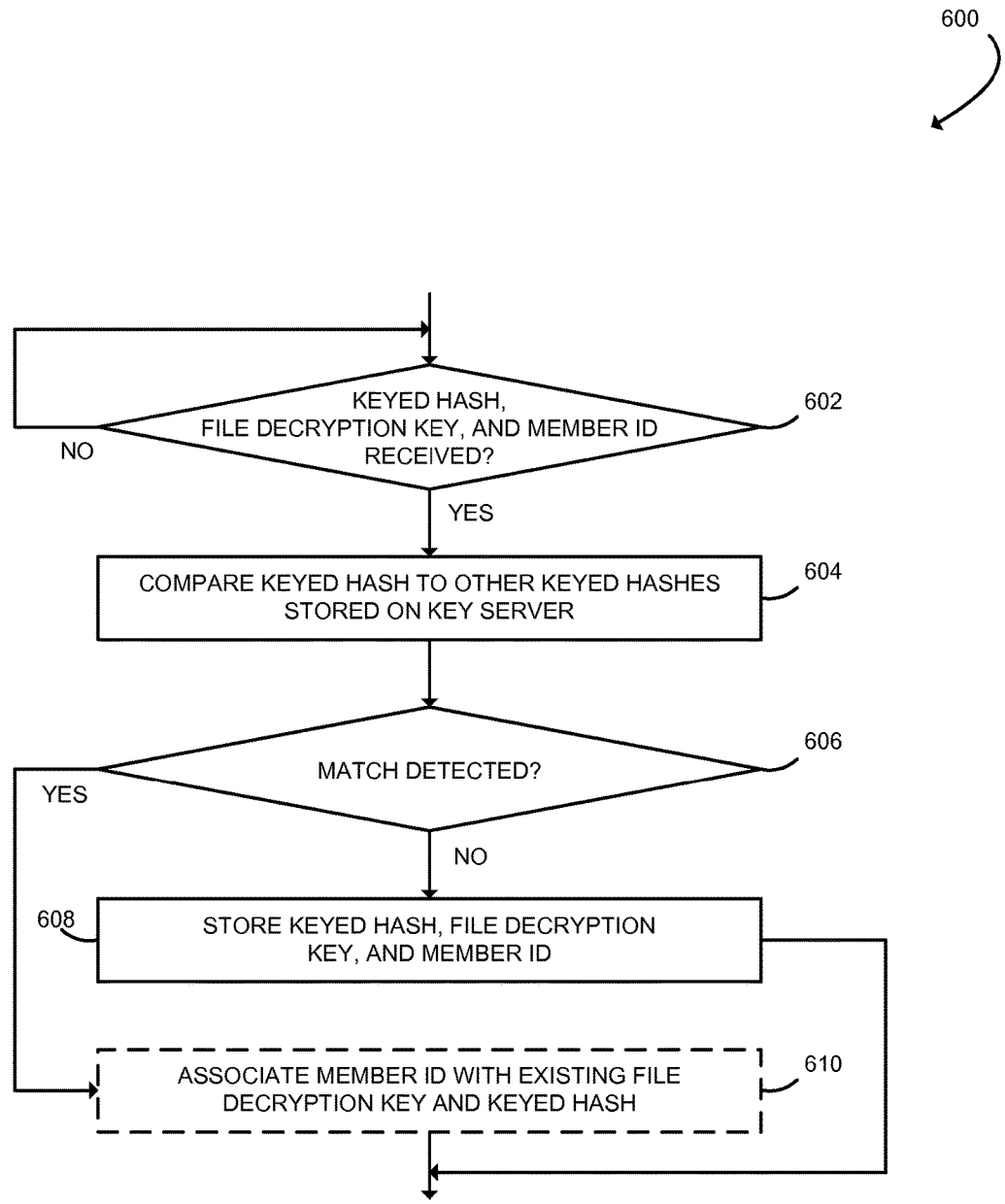
FIG. 6 is a simplified flow diagram of at least one embodiment of a method for de-duplicating cryptographic keys on a key server of the system of FIG. 1.

Referring now to FIG. 6, in use, the key server 108 may execute a method 600 for de-duplicating cryptographic keys. The method 600 begins with block 602 in which the key server 108 determines whether a keyed hash, member ID, and file decryption key 212 have been received from a computing device 102. If so, the requisite information for storing a key on the key server 108 has been transmitted, and the key server 108 compares the received keyed hash to other keyed hashes stored on the key server 108 in block 604.

Similar to method 500, if a match between the received keyed hash and one of the stored keyed hashes (i.e., they are the same hash) is not found in block 606, the key server 108 stores the received keyed hash, file decryption key 212, and member ID on the key server 108 in block 608 and associates each received information with each other. However, if a match is found in block 606, the key server 108 may, in some embodiments, associate the member ID of the computing device 102 with the existing file decryption key 212 and keyed hash (i.e., the matching keyed hash) in block 610 rather than storing duplicate information. In another embodiment, nothing is stored on the key server 108 in the event of a match. It should be appreciated that the key server 108 may use any suitable data structure to organize or associate keyed hashes, member IDs, and file decryption keys with one another.

Figure 7:
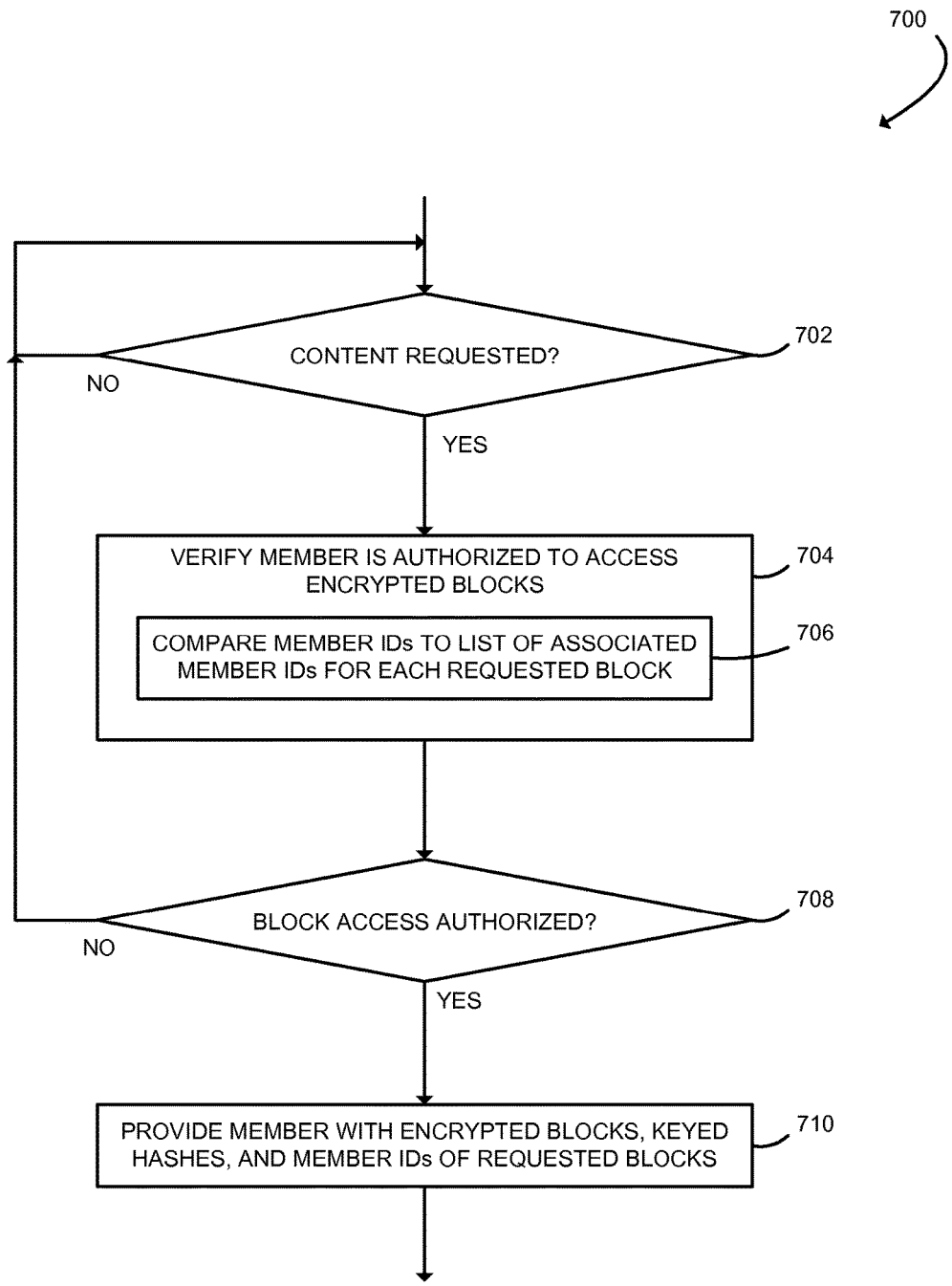
FIG. 7 is a simplified flow diagram of at least one embodiment of a method for providing requested content on a content data server of the system of FIG. 1.

Referring now to FIG. 7, in use, the content data server 106 may execute a method 700 for providing requested content to a computing device 102. The method 700 begins with block 702 in which the content data server 106 determines whether one of the computing devices 102 has requested content from the content data server 106. If so, the content data server 106 verifies that the computing device 102 is authorized to access the requested content (i.e., the requested encrypted blocks) in block 704. In doing so, in some embodiments, the content data server 106 compares, in block 706, the member ID of the computing device 102 to the list of associated member IDs for each requested encrypted block. As discussed above, in some embodiments, the content data server 106 maintains for each encrypted block a list of member IDs for each member device that stored or attempted to store the corresponding keyed hash to the content data server 106. As such, the list indicates which computing devices 102 had previous "ownership" of the decrypted data associated with the encrypted block. Of course, other means may be employed to determine whether a particular member is authorized to access an encrypted block in other embodiments. For example, in some embodiments, a standard authentication and access control protocol may be executed (e.g., prior to block 702). In block 708, the content data server 106 determines whether access is authorized. If so, the content data server 106 transmits or otherwise provides the requesting computing device 102 (i.e., the member device) with the requested encrypted blocks, the keyed hashes associated with the requested encrypted blocks, and the member IDs associated with the requested encrypted blocks in block 710. Of course, a different computing device 102 can request a particular data block than the computing device 102 that initially transmitted the block to the content data server 106.

Figure 8:
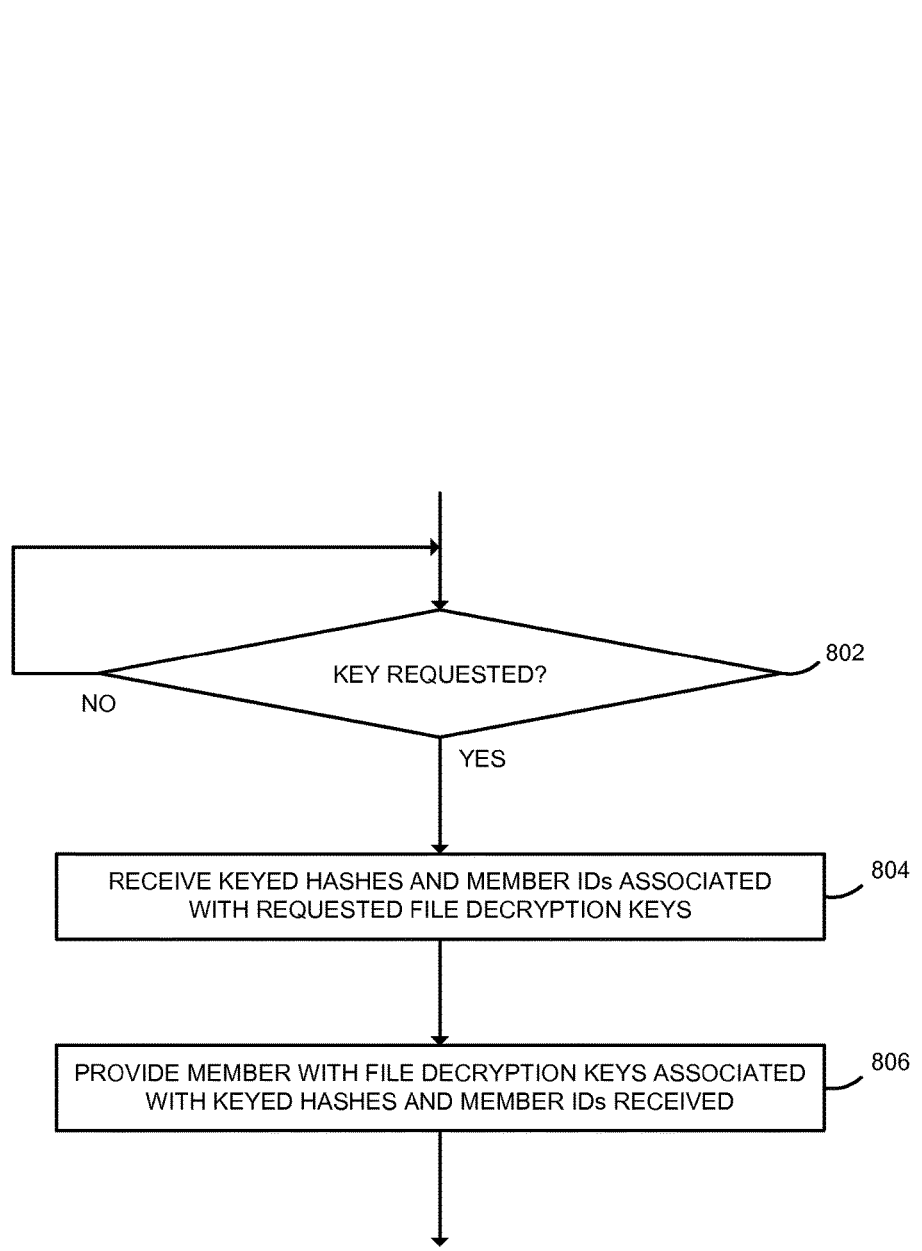
FIG. 8 is a simplified flow diagram of at least one embodiment of a method for providing requested keys on a key server of the system of FIG. 1.

Referring now to FIG. 8, in use, the key server 108 may execute a method 800 for providing requested keys to a computing device 102. The method 800 begins with block 802 in which the key server 108 determines whether one of the computing devices 102 has requested file decryption keys 212 from the key server 108. If so, the key server 108 receives the keyed hashes and member IDs associated with the desired file decryption keys 212 in block 804. In block 806, the key server 108 transmits or otherwise provides the requesting computing device 102 (i.e., the member device) with the requested file decryption keys 212 associated with the provided keyed hashes and member IDs. Additionally, in some embodiments, the key server 108 executes a method similar to that of the content data server 106 to also verify the requesting computing device 102 is authorized to access the requested file decryption keys 212 (See block 704 of FIG. 7). As discussed above, the requesting computing device 102 may apply the file decryption keys 212 to the encrypted blocks received from the content data server 106 to decrypt the encrypted data blocks. The decrypted blocks may then be reconstructed to generate the desired file. Of course, in embodiments in which the file decryption keys 212 are further encrypted by a member encryption keys 208, the computing device 102 may use the member IDs of those member devices to request their corresponding member decryption keys 208.

EXAMPLES

Illustrative examples of the technologies disclosed herein are provided below. An embodiment of the technologies may include any one or more, and any combination of, the examples described below.

Example 1 includes a computing device for storing content on a content data server in a data de-duplication system, the computing device comprising a cryptographic module to (i) encrypt each block of a fragmented file using a file encryption key generated by the computing device, (ii) generate a keyed hash of each block using a community key, and (iii) encrypt a file decryption key using a member encryption key of the computing device; and a communication module to transmit to the content data server each encrypted block, the keyed hash of each block, and a member identification that identifies the computing device; and transmit to a key server the keyed hash of each block, the encrypted file decryption key, and the member identification.

Example 2 includes the subject matter of Example 1, and further including a file management module to fragment a file of the computing device to generate the each block of the fragmented file.

Example 3 includes the subject matter of any of Examples 1 and 2, and further including a file management module to generate a list of each keyed hash associated with each block belonging to the fragmented file.

Example 4 includes the subject matter of any of Examples 1-3, and wherein the cryptography module is to encrypt the list using the member encryption key; and the communication module is to transmit the encrypted list to at least one of the content data server and the key server.

Example 5 includes the subject matter of any of Examples 1-4, and wherein the keyed hash comprises a keyed secure hash algorithm (SHA).

Example 6 includes the subject matter of any of Examples 1-5, and wherein the file encryption key and the file decryption key are the same symmetric cryptographic key.

Example 7 includes a computing device for retrieving content from a content data server in a data de-duplication system, the computing device comprising a communication module to receive from the content data server (i) encrypted blocks of a fragmented file, (ii) a keyed hash associated with each of the encrypted blocks, and (iii) a member identification for each encrypted block that identifies a computing device that has previously stored the corresponding encrypted block on the content data server; receive an encrypted file decryption key for each of the encrypted blocks from a key server in response to transmitting the keyed hash and the member identification associated with each corresponding encrypted block to the key server; transmit each received encrypted file decryption key that is encrypted with a member encryption key corresponding to another member device, other than the computing device, to the another member device for decryption with a member decryption key of the another member device; and receive, from the another member device, the decrypted file decryption key corresponding to the each received encrypted file decryption key that is encrypted with the member encryption key of the another member device; and a cryptographic module to (i) decrypt each encrypted file decryption key that is encrypted with a member encryption key of the computing device with a corresponding member decryption key of the computing device and (ii) decrypt each of the encrypted blocks using the decrypted file decryption key associated with each corresponding encrypted block.

Example 8 includes the subject matter of Example 7, and wherein the communication module is to receive an encrypted list of each keyed hash associated with each of the encrypted blocks of the fragmented file; and the cryptographic module is to decrypt the encrypted list using the member decryption key of the computing device.

Example 9 includes the subject matter of any of Examples 7 and 8, and further including a file management module to generate a file by combining the decrypted blocks based on the decrypted list.

Example 10 includes the subject matter of any of Examples 7-9, and wherein the cryptographic module is to generate a reference keyed hash of each of the decrypted blocks using the community key; and compare the reference keyed hash of each of the decrypted blocks to the received keyed hash associated with each of the encrypted blocks to verify the integrity of each block.

Example 11 includes a method for storing content on a content data server in a data de-duplication system, the method comprising encrypting, with a computing device, each block of a fragmented file using a file encryption key generated by the computing device; generating, on the computing device, a keyed hash of each block using a community key; encrypting, on the computing device, a file decryption key using a member encryption key of the computing device; transmitting, from the computing device, (i) each encrypted block, (ii) the keyed hash of each block, and (iii) a member identification that identifies the computing device to the content data server; and transmitting, from the computing device, (i) the keyed hash of each block, (ii) the encrypted file decryption key, and (iii) the member identification to a key server.

Example 12 includes the subject matter of Example 11, and further including fragmenting, on the computing device, a file of the computing device to generate the each block of the fragmented file.

Example 13 includes the subject matter of any of Examples 11 and 12, and further including generating, on the computing device, a list of each keyed hash associated with each block belonging to the fragmented file.

Example 14 includes the subject matter of any of Examples 11-13, and further including encrypting, on the computing device, the list using the member encryption key; and transmitting, from the computing device, the encrypted list to at least one of the content data server and the key server.

Example 15 includes the subject matter of any of Examples 11-14, and wherein generating the keyed hash comprises generating a keyed secure hash algorithm (SHA) of each block using the community key.

Example 16 includes the subject matter of any of Examples 11-15, and wherein the file encryption key and the file decryption key are the same symmetric cryptographic key.

Example 17 includes a computing device comprising a processor; and a memory having stored therein a plurality of instructions that when executed by the processor cause the computing device to perform the method of any of Examples 11-16.

Example 18 includes one or more machine readable storage media comprising a plurality of instructions stored thereon that in response to being executed result in a computing device performing the method of any of Examples 11-16.

Example 19 includes a method for retrieving content from a content data server in a data de-duplication system, the method comprising receiving, with a computing device and from the content data server, (i) encrypted blocks of a fragmented file, (ii) a keyed hash associated with each of the encrypted blocks, and (iii) a member identification for each encrypted block that identifies a computing device that has previously stored the corresponding encrypted block on the content data server; receiving, with the computing device, an encrypted file decryption key for each of the encrypted blocks from a key server in response to transmitting the keyed hash and the member identification associated with each corresponding encrypted block to the key server; transmitting, with the computing device, each received encrypted file decryption key that is encrypted with a member encryption key corresponding to another member device, other than the computing device, to the another member device for decryption with a member decryption key of the another member device; receiving, with the computing device and from the another member device, the decrypted file decryption key corresponding to the each received encrypted file decryption key that is encrypted with the member encryption key of the another member device; decrypting, on the computing device, each encrypted file decryption key that is encrypted with a member encryption key of the computing device with a corresponding member decryption key of the computing device decrypting, on the computing device, each of the encrypted blocks using the decrypted file decryption key associated with each corresponding encrypted block.

Example 20 includes the subject matter of Example 19, and further including receiving, with the computing device, an encrypted list of each keyed hash associated with each of the encrypted blocks of the fragmented file; and decrypting, on the computing device, the encrypted list using the member decryption key of the computing device.

Example 21 includes the subject matter of any of Examples 19 and 20, and further including generating a file by combining the decrypted blocks based on the decrypted list.

Example 22 includes the subject matter of any of Examples 19-21, and further including generating, on the computing device, a reference keyed hash of each of the decrypted blocks using the community key; and comparing, with the computing device, the reference keyed hash of each of the decrypted blocks to the received keyed hash associated with each of the encrypted blocks to verify the integrity of each block.

Example 23 includes a computing device comprising a processor; and a memory having stored therein a plurality of instructions that when executed by the processor cause the computing device to perform the method of any of Examples 19-22.

Example 24 includes one or more machine readable storage media comprising a plurality of instructions stored thereon that in response to being executed result in a computing device performing the method of any of Examples 19-22.

Example 25 includes a method for de-duplicating encrypted content on a content data server of a data de-duplication system, the method comprising receiving, with the content data server, (i) a keyed hash of a block of a fragmented file, (ii) an encrypted version of the block, and (iii) a member identification from a first member device of the de-duplication system, the member identification identifying the first member device; comparing, on the content data server, the keyed hash to other keyed hashes stored on the content data server; storing, on the content data server, the encrypted block, the keyed hash, and the member identification in response to the keyed hash not matching any of the other stored keyed hashes; associating, on the content data server, the member identification with a stored encrypted block and keyed hash in response to the keyed hash matching the stored keyed hash; determining, on the content data server, whether a second member device of the de-duplication system is authorized to access the encrypted block in response to a request from the second member device for the encrypted block; and providing, with the content data server, the encrypted block, the keyed hash, and the member identification in response to determining the second member device is authorized to access the encrypted block.

Example 26 includes the subject matter of Example 25, and further including storing an encrypted list of each keyed hash associated with each encrypted block of the fragmented file received from the first member device.

Example 27 includes the subject matter of any of Examples 25 and 26, and wherein determining whether the second member device is authorized to access the encrypted block comprises comparing the member identification of the second member device to a list of authorized member identifications for the encrypted block.

Example 28 includes a computing device comprising a processor; and a memory having stored therein a plurality of instructions that when executed by the processor cause the computing device to perform the method of any of Examples 25-27.

Example 29 includes one or more machine readable storage media comprising a plurality of instructions stored thereon that in response to being executed result in a computing device performing the method of any of Examples 25-27.

Example 30 includes a method for de-duplicating cryptographic keys on a key server of a data de-duplication system, the method comprising receiving, with the key server and from a first member device of the de-duplication system, (i) a file decryption key encrypted with a member encryption key of the first member device, (ii) a keyed hash, and (iii) a member identification from a first member device of the de-duplication system, the member identification identifying the first member device; comparing, on the key server, the keyed hash to other keyed hashes stored on the key server; storing, on the key server, the encrypted file decryption key, the keyed hash, and the member identification in response to the keyed hash not matching any of the other stored keyed hashes; and providing, with the key server, the encrypted file decryption key corresponding with the keyed hash and the member identification in response to a request from a second member device of the de-duplication system for the encrypted file decryption key.

Example 31 includes the subject matter of Example 30, and further including storing an encrypted list of each keyed hash associated with each encrypted block of the fragmented file received from the first member device.

Example 32 includes the subject matter of and of Examples 30 and 31, and further including associating, on the key server, the member identification with a stored encrypted file decryption key and keyed hash in response to the keyed hash matching the stored keyed hash, wherein providing the encrypted file decryption key is in response to determining the member identification of the second member device is on a list of authorized member identifications for the encrypted file decryption key.

Example 33 includes a computing device comprising a processor; and a memory having stored therein a plurality of instructions that when executed by the processor cause the computing device to perform the method of any of Examples 30-32.

Example 34 includes one or more machine readable storage media comprising a plurality of instructions stored thereon that in response to being executed result in a computing device performing the method of any of Examples 30-32.

Example 35 includes a computing device for storing content on a content data server in a data de-duplication system, the computing device comprising means for encrypting each block of a fragmented file using a file encryption key generated by the computing device; means for generating a keyed hash of each block using a community key; means for encrypting a file decryption key using a member encryption key of the computing device; means for transmitting (i) each encrypted block, (ii) the keyed hash of each block, and (iii) a member identification that identifies the computing device to the content data server; and means for transmitting (i) the keyed hash of each block, (ii) the encrypted file decryption key, and (iii) the member identification to a key server.

Example 36 includes the subject matter of Example 35, and further including means for fragmenting a file of the computing device to generate the each block of the fragmented file.

Example 37 includes the subject matter of any of Examples 35 and 36, and further including means for generating a list of each keyed hash associated with each block belonging to the fragmented file.

Example 38 includes the subject matter of any of Examples 35-37, and further including means for encrypting the list using the member encryption key; and means for transmitting the encrypted list to at least one of the content data server and the key server.

Example 39 includes the subject matter of any of Examples 35-38, and wherein the means for generating the keyed hash comprises means for generating a keyed secure hash algorithm (SHA) of each block using the community key.

Example 40 includes the subject matter of any of Examples 35-39, and wherein the file encryption key and the file decryption key are the same symmetric cryptographic key.

Example 41 includes a computing device for retrieving content from a content data server in a data de-duplication system, the computing device comprising means for receiving, from the content data server, (i) encrypted blocks of a fragmented file, (ii) a keyed hash associated with each of the encrypted blocks, and (iii) a member identification for each encrypted block that identifies a computing device that has previously stored the corresponding encrypted block on the content data server; means for receiving an encrypted file decryption key for each of the encrypted blocks from a key server in response to transmitting the keyed hash and the member identification associated with each corresponding encrypted block to the key server; means for transmitting each received encrypted file decryption key that is encrypted with a member encryption key corresponding to another member device, other than the computing device, to the another member device for decryption with a member decryption key of the another member device; means for receiving, from the another member device, the decrypted file decryption key corresponding to the each received encrypted file decryption key that is encrypted with the member encryption key of the another member device; means for decrypting each encrypted file decryption key that is encrypted with a member encryption key of the computing device with a corresponding member decryption key of the computing device means for decrypting each of the encrypted blocks using the decrypted file decryption key associated with each corresponding encrypted block.

Example 42 includes the subject matter of Example 41, and further including means for receiving an encrypted list of each keyed hash associated with each of the encrypted blocks of the fragmented file; and means for decrypting the encrypted list using the member decryption key of the computing device.

Example 43 includes the subject matter of any of Examples 41 and 42, and further including means for generating a file by combining the decrypted blocks based on the decrypted list.

Example 44 includes the subject matter of any of Examples 41-43, and further including means for generating a reference keyed hash of each of the decrypted blocks using the community key; and means for comparing the reference keyed hash of each of the decrypted blocks to the received keyed hash associated with each of the encrypted blocks to verify the integrity of each block.

Example 45 includes a computing device of a de-duplication system for de-duplicating encrypted content, the computing device comprising means for receiving (i) a keyed hash of a block of a fragmented file, (ii) an encrypted version of the block, and (iii) a member identification from a first member device of the de-duplication system, the member identification identifying the first member device; means for comparing the keyed hash to other keyed hashes stored on the content data server; means for storing the encrypted block, the keyed hash, and the member identification in response to the keyed hash not matching any of the other stored keyed hashes; means for associating the member identification with a stored encrypted block and keyed hash in response to the keyed hash matching the stored keyed hash; means for determining whether a second member device of the de-duplication system is authorized to access the encrypted block in response to a request from the second member device for the encrypted block; and means for providing the encrypted block, the keyed hash, and the member identification in response to determining the second member device is authorized to access the encrypted block.

Example 46 includes the subject matter of Example 45, and further including means for storing an encrypted list of each keyed hash associated with each encrypted block of the fragmented file received from the first member device.

Example 47 includes the subject matter of any of Examples 45 and 46, and wherein the means for determining whether the second member device is authorized to access the encrypted block comprises means for comparing the member identification of the second member device to a list of authorized member identifications for the encrypted block.

Example 48 includes a computing device of a data de-duplication system for de-duplicating cryptographic keys, the computing device comprising means for receiving, from a first member device of the de-duplication system, (i) a file decryption key encrypted with a member encryption key of the first member device, (ii) a keyed hash, and (iii) a member identification from a first member device of the de-duplication system, the member identification identifying the first member device; means for comparing the keyed hash to other keyed hashes stored on the key server; means for storing the encrypted file decryption key, the keyed hash, and the member identification in response to the keyed hash not matching any of the other stored keyed hashes; and means for providing the encrypted file decryption key corresponding with the keyed hash and the member identification in response to a request from a second member device of the de-duplication system for the encrypted file decryption key.

Example 49 includes the subject matter of Example 48, and further including means for storing an encrypted list of each keyed hash associated with each encrypted block of the fragmented file received from the first member device.

Example 50 includes the subject matter of any of Examples 48 and 49, and further including means for associating the member identification with a stored encrypted file decryption key and keyed hash in response to the keyed hash matching the stored keyed hash, wherein providing the encrypted file decryption key is in response to determining the member identification of the second member device is on a list of authorized member identifications for the encrypted file decryption key.

The invention claimed is:

1. A system for block-level deduplication and key management, the system comprising:
one or more processors; and
one or more memories having a plurality of instructions stored thereon that, when executed by the one or more processors, causes the system to:
identify an encrypted version of a block of a fragmented file and a first identification of a first requesting entity, wherein the block comprises a fragment of the fragmented file and wherein the encrypted version of the block is generated by encryption of the block with a file encryption key generated by the first requesting entity, and wherein the block is requested to be stored by the first requesting entity;

determine whether the block has previously been stored by the system based on a cryptographic hash of the block, wherein the cryptographic hash comprises a keyed hash generated with a community key of a group of entities including the first requesting entity;

store the encrypted version of the block in response to a determination that the block has not previously been stored by the system; and store the first identification of the first requesting entity in association with the encrypted version of the block as an authorization of the first requesting entity to subsequently access the encrypted version of the block, wherein the first identification comprises a data item provided by the first requesting entity and indicative of the first requesting entity;

receive a request, from a second requesting entity, to store a candidate block wherein the second requesting entity is included in the group of entities;

determine that the candidate block has previously been stored, based on a determination that a candidate cryptographic hash of the candidate block matches the cryptographic hash of the block; and store a second identification of the second requesting entity in association with the encrypted version of the block in response to a determination that the candidate block has previously been stored, wherein the second identification comprises a data item provided by the second requesting entity and indicative of the second requesting entity.

2. The system of claim 1, wherein to determine whether the block has previously been stored by the system comprises to compare a cryptographic hash of the block to cryptographic hashes of blocks previously stored by the system.

3. The system of claim 1, wherein to identify the encrypted version of the block comprises to identify, for each block of the fragmented file, an encrypted version of the block from a requesting entity;

wherein to determine whether the block has previously been stored comprises to determine, for each block of the fragmented file, whether the block has previously been stored by the system based on a cryptographic hash of the block; and wherein to store the encrypted version of the block comprises to store, for each block of the fragmented file, the encrypted version of the block in response to a determination that the block has not previously been stored by the system.

4. The system of claim 1, wherein the plurality of instructions further causes the system to:

determine whether the second requesting entity is authorized to access the encrypted version of the block in response to a request from the second requesting entity for the encrypted block; and provide the encrypted version of the block to the second requesting entity in response to a determination that the second requesting entity is authorized to access the encrypted version of the block.

5. The system of claim 4, wherein to determine whether the second requesting entity is authorized to access the encrypted version of the block comprises to determine whether the second identification of the second requesting entity is associated with the encrypted version of the block.

6. The system of claim 5, wherein to determine whether the second requesting entity is authorized to access the encrypted version of the block comprises to compare the second identification of the second requesting entity to an ownership list of authorized device identifications for the encrypted version of the block.

7. The system of claim 1, wherein to identify the first identification of the first requesting entity comprises to identify an identification of a computing device.

8. One or more non-transitory, machine-readable storage media comprising a plurality of instructions stored thereon that, in response to execution by one or more processors of a system, causes the system to:

identify an encrypted version of a block of a fragmented file and a first identification of a first requesting entity, wherein the block comprises a fragment of the fragmented file and wherein the encrypted version of the block is generated by encryption of the block with a file encryption key generated by the first requesting entity, and wherein the block is requested to be stored by the first requesting entity;

determine whether the block has previously been stored by the system based on a cryptographic hash of the block, wherein the cryptographic hash comprises a keyed hash generated with a community key of a group of entities including the first requesting entity;

store the encrypted version of the block in response to a determination that the block has not previously been stored by the system; and store the first identification of the first requesting entity in association with the encrypted version of the block as an authorization of the first requesting entity to subsequently access the encrypted version of the block, wherein the first identification comprises a data item provided by the first requesting entity and indicative of the first requesting entity;

receive a request, from a second requesting entity, to store a candidate block, wherein the second requesting entity is included in the group of entities;

determine that the candidate block has previously been stored, based on a determination that a candidate cryptographic hash of the candidate block matches the cryptographic hash of the block; and store a second identification of the second requesting entity in association with the encrypted version of the block in response to determining that the candidate block has previously been stored, wherein the second identification comprises a data item provided by the second requesting entity and indicative of the second requesting entity.

9. The one or more non-transitory, machine-readable storage media of claim 8, wherein to determine whether the block has previously been stored by the system comprises to compare a cryptographic hash of the block to cryptographic hashes of blocks previously stored by the system.

10. The one or more non-transitory, machine-readable storage media of claim 8, wherein to identify the encrypted version of the block comprises to identify, for each block of the fragmented file, an encrypted version of the block from a requesting entity;

wherein to determine whether the block has previously been stored comprises to determine, for each block of the fragmented file, whether the block has previously been stored by the system based on a cryptographic hash of the block; and wherein to store the encrypted version of the block comprises to store, for each block of the fragmented file, the encrypted version of the block in response to a determination that the block has not previously been stored by the system.

11. The one or more non-transitory, machine-readable storage media of claim 8, wherein the plurality of instructions further causes the system to:
   determine whether the second requesting entity is authorized to access the encrypted version of the block in response to a request from the second requesting entity for the encrypted block; and
   provide the encrypted version of the block to the second requesting entity in response to a determination that the second requesting entity is authorized to access the encrypted version of the block.

12. The one or more non-transitory, machine-readable storage media of claim 11, wherein to determine whether the second requesting entity is authorized to access the encrypted version of the block comprises to determine whether the second identification of the second requesting entity is associated with the encrypted version of the block.

13. The one or more non-transitory, machine-readable storage media of claim 12, wherein to determine whether the second requesting entity is authorized to access the encrypted version of the block comprises to compare the second identification of the second requesting entity to an ownership list of authorized device identifications for the encrypted version of the block.

14. The one or more non-transitory, machine-readable storage media of claim 8, wherein to identify the first identification of the first requesting entity comprises to identify an identification of a computing device.

15. A method for block-level deduplication and key management by a system, the method comprising:
   identifying, by the system, an encrypted version of a block of a fragmented file and a first identification of a first requesting entity, wherein the block comprises a fragment of the fragmented file and wherein the encrypted version of the block is generated by encrypting the block with a file encryption key generated by the first requesting entity, and wherein the block is requested to be stored by the first requesting entity;
   determining, by the system, whether the block has previously been stored by the system based on a cryptographic hash of the block, wherein the cryptographic hash comprises a keyed hash generated with a community key of a group of entities including the first requesting entity;
   storing, by the system, the encrypted version of the block in response to determining that the block has not previously been stored by the system; and
   storing, by the system, the first identification of the first requesting entity in association with the encrypted version of the block as an authorization of the first requesting entity to subsequently access the encrypted version of the block, wherein the first identification comprises a data item provided by the first requesting entity and indicative of the first requesting entity;
   receiving, by the system, a request from a second requesting entity to store a candidate block, wherein the second requesting entity is included in the group of entities;
   determining, by the system, that the candidate block has previously been stored, based on a determination that a candidate cryptographic hash of the candidate block matches the cryptographic hash of the block; and
   storing, by the system, a second identification of the second requesting entity in association with the encrypted version of the block in response to determining that the candidate block has previously been stored, wherein the second identification comprises a data item provided by the second requesting entity and indicative of the second requesting entity.

16. The method of claim 15, wherein determining whether the block has previously been stored by the system comprises comparing a cryptographic hash of the block to cryptographic hashes of blocks previously stored by the system.

17. The method of claim 15, wherein identifying the encrypted version of the block comprises identifying, for each block of the fragmented file, an encrypted version of the block from a requesting entity;
   wherein determining whether the block has previously been stored comprises determining, for each block of the fragmented file, whether the block has previously been stored by the system based on a cryptographic hash of the block; and
   wherein storing the encrypted version of the block comprises storing, for each block of the fragmented file, the encrypted version of the block in response to determining that the block has not previously been stored by the system.

18. The method of claim 15, further comprising:
   determining, by the system, whether the second requesting entity is authorized to access the encrypted version of the block in response to a request from the second requesting entity for the encrypted block; and
   providing, by the system, the encrypted version of the block to the second requesting entity in response to determining that the second requesting entity is authorized to access the encrypted version of the block.

19. The method of claim 18, wherein determining whether the second requesting entity is authorized to access the encrypted version of the block comprises determining whether the second identification of the second requesting entity is associated with the encrypted version of the block.

20. The method of claim 19, wherein determining whether the second requesting entity is authorized to access the encrypted version of the block comprises comparing the second identification of the second requesting entity to an ownership list of authorized device identifications for the encrypted version of the block.

21. The method of claim 15, wherein identifying the first identification of the first requesting entity comprises identifying an identification of a computing device.

* * * * *